Oct. 12, 1937.   C. E. CARPENTER   2,095,731
DOUGHNUT MACHINE AND THE LIKE
Original Filed Dec. 15, 1930   3 Sheets-Sheet 2
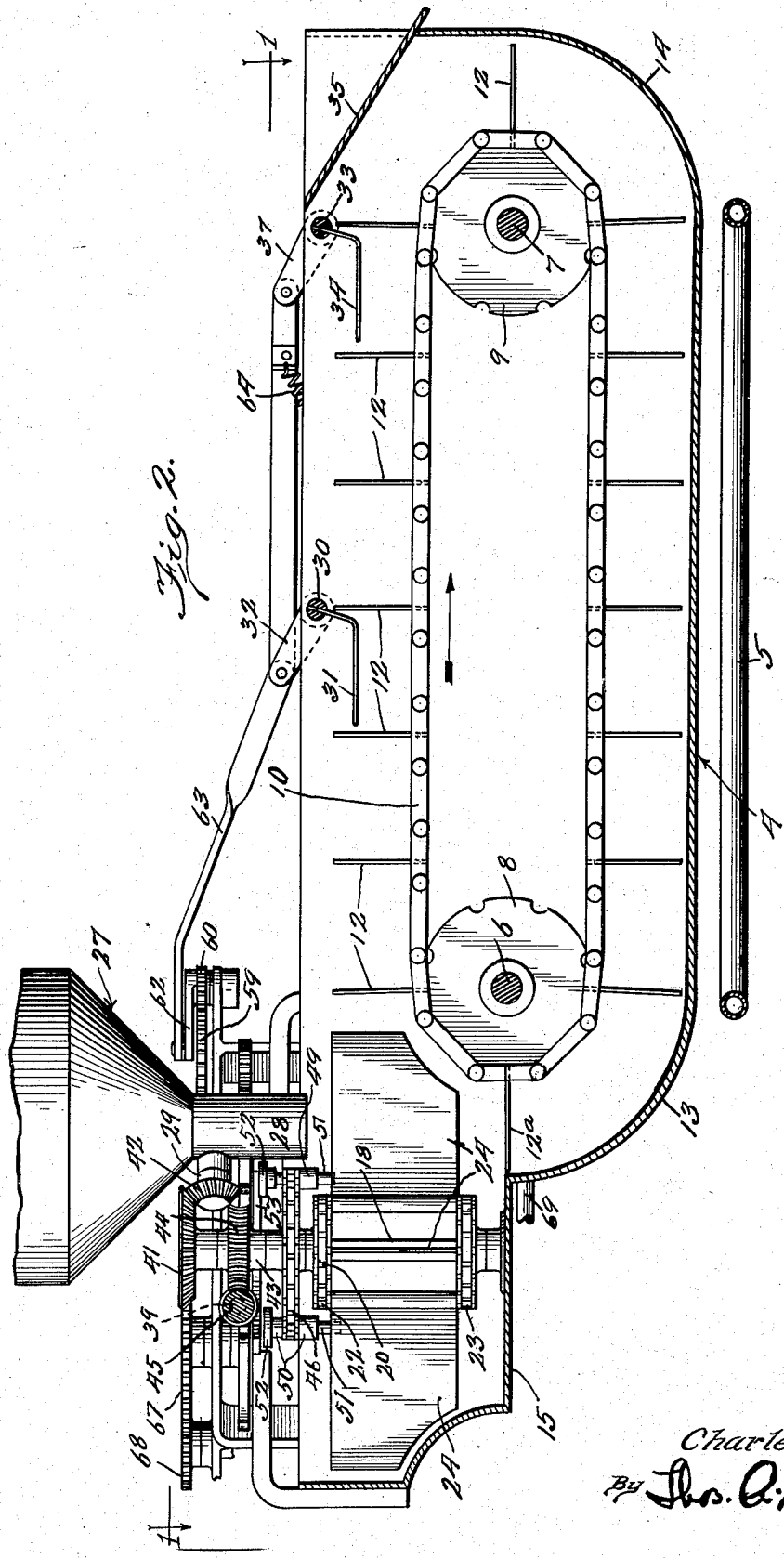
Inventor:
Charles E. Carpenter
By Thos. A. Daunay
Atty.

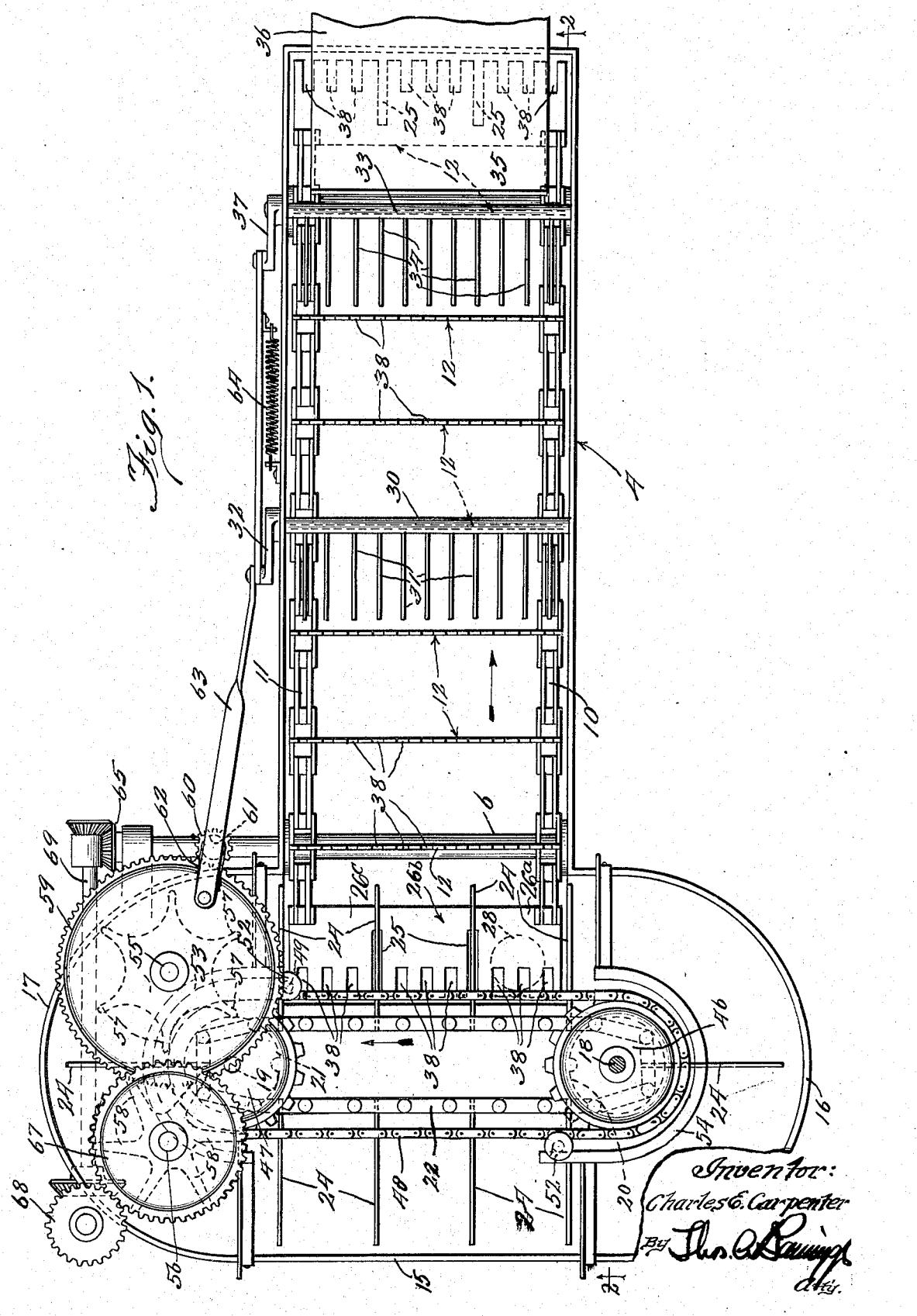

Oct. 12, 1937.  C. E. CARPENTER  2,095,731
DOUGHNUT MACHINE AND THE LIKE
Original Filed Dec. 15, 1930  3 Sheets—Sheet 3
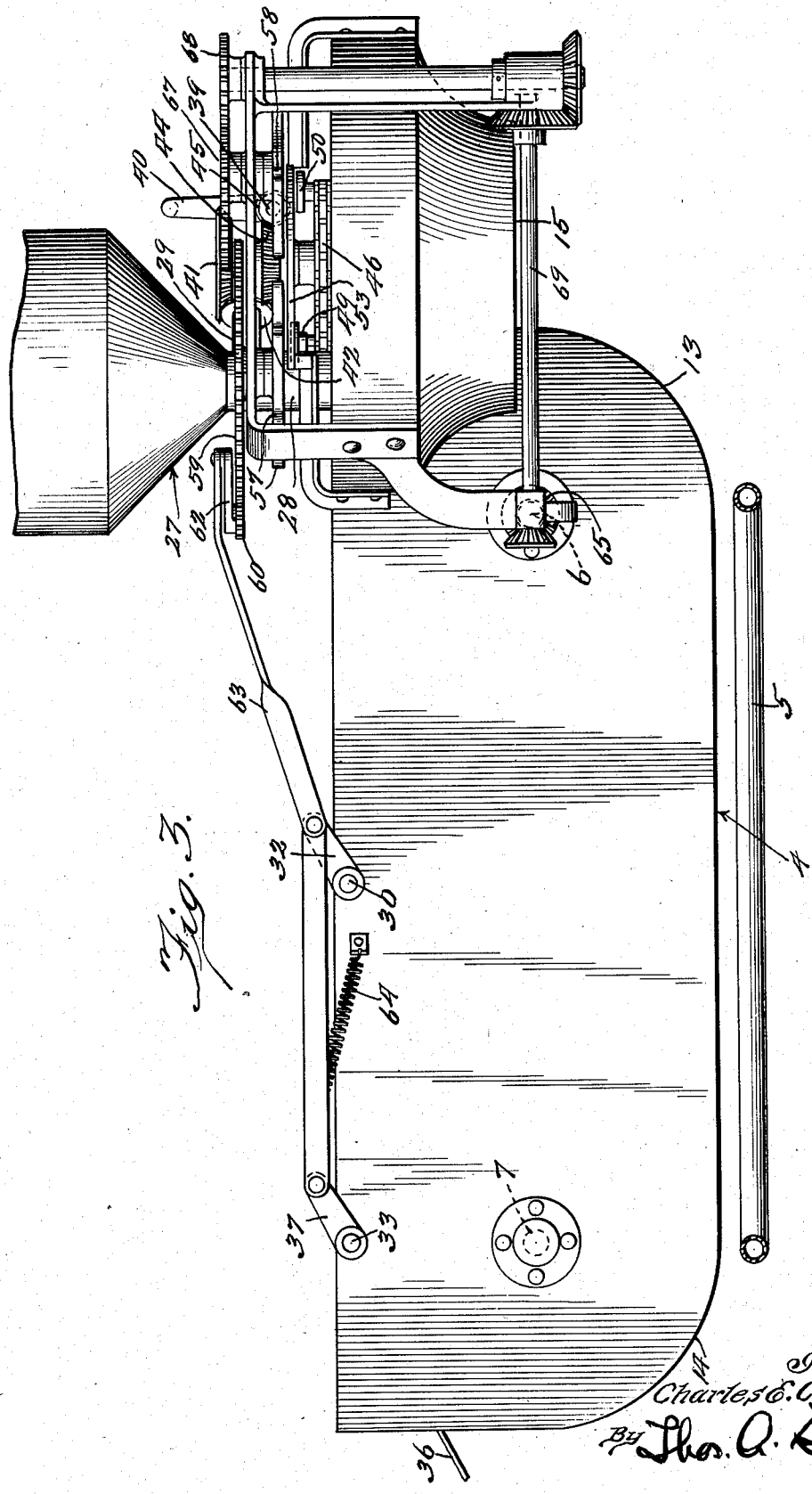

Patented Oct. 12, 1937

2,095,731

UNITED STATES PATENT OFFICE 2,095,731

DOUGHNUT MACHINE AND THE LIKE

Charles E. Carpenter, Chicago, Ill., assignor to Alexander S. T. Lagaard, Minneapolis, Minn.

Refiled for abandoned application Serial No. 502,490, December 15, 1930. This application April 21, 1934, Serial No. 721,820

12 Claims. (Cl. 53—7)

This application is refiled for my earlier application Serial Number 502,490, filed Dec. 15, 1930.

This invention has to do with improvements in machines for making doughnuts and the like. The invention relates to certain improvements in machines for the above purpose which are so constructed as to be capable of relatively large volume production in doughnuts produced per hour; but the features of the invention may also be advantageously used in connection with machines of smaller size and intended to operate at lower rates of production.

One object of the invention is to provide an arrangement whereby the doughnuts may be located in the frying pan or cooking vessel and finally delivered therefrom in completely cooked condition. Thus, for example, the doughnuts may be located in groups of three or more such as five, and these groups of doughnuts may then be advanced through the cooking vessel as distinct groups.

One object of the invention is to provide an arrangement whereby the doughnuts may be individually formed and delivered in to the frying pan from a single doughnut forming mechanism. In this connection, one feature of the invention relates to the provision of a device embodying the above feature and which is also so constructed that as the individual doughnuts are delivered in to the hot grease of the frying pan from a single stationary doughnut forming mechanism, they are then moved laterally in sequence so as to establish a row of the specified number extending across the width of the frying pan or cooking vessel; and then this group is advanced lengthwise of the frying pan or cooking vessel as a group and is finally delivered therefrom after being properly cooked or fried.

By the use of the above arrangement, the individual doughnuts as they are formed by the doughnut forming mechanism are all dropped into the hot grease of the frying pan or cooking vessel at a given location, and they are shifted laterally into a row extending across the frying pan or cooking vessel, and then these rows are bodily advanced lengthwise of the frying pan or cooking vessel so as to perform and complete the cooking operations.

The device is also in some cases provided with means for turning the cooking or frying doughnuts during the interval that they are in the frying pan or cooking vessel, and also in some cases means are provided for delivering the completely fried doughnuts from the frying pan or cooking vessel as they arrive at a delivery point.

In Letters Patent of the United States No. 1,776,781, issued to me September 30, 1930, for improvements in doughnut machines and the like, I have disclosed a construction of machine in which the doughnut forming device itself may be shifted bodily back and forth over the frying pan or cooking vessel so as to drop the consecutive doughnuts in a row extending across the frying pan, which row is thereafter advanced lengthwise of the frying pan during the cooking operation. In the present case, the doughnut forming mechanism is located stationary, and the doughnuts themselves are advanced across the width of the frying pan or cooking vessel in order to form a row thereof.

Another feature of the invention relates to an improved construction of device whereby the action of the doughnuts when originally introduced into the bath of hot grease may be controlled. In this connection, it will be understood that when a raw doughnut is first dropped into the hot liquid grease, it settles down into the body of the grease and remains completely submerged for a short interval, generally a few seconds; and during this interval it expands or puffs out sufficiently so that its buoyancy becomes sufficient to cause it to rise to the top of the grease and float thereon. When it commences to float it remains approximately one-half of its bulk submerged in the grease bath.

In order to more effectively control the action of the doughnuts during this preliminary stage of the cooking operation, I have provided a submerged platform or deck in the body of the grease onto which the doughnut falls and by which it is initially sustained when originally introduced into the grease bath.

The doughnuts rest flat on this submerged deck or platform and are sustained thereby until they become of sufficient buoyancy to rise and float on the surface of the grease. By this means the positions of the doughnuts are better controlled and when they rise to the top they will be more accurately located in the desired position for subsequent movements.

Other objects and uses of the invention will appear from a detailed description of the same, which consists in the features of construction and combinations of parts hereinafter described and claimed.

In the drawings:

Figure 1 shows a plan view of the machine embodying the features of my present invention, the doughnut forming and dropping mechanism and certain other parts having been removed in order to show the construction of the machine to a better advantage; and Figure 1 may be considered as a section taken on line 1—1 of Figure 2, looking in the direction of the arrows;

Figure 2 shows a longitudinal vertical section substantially on the line 2—2 of Figure 1, looking in the direction of the arrows; and Figure 3 shows a detail back elevational view of the machine.

The machine herein illustrated is provided with a cooking or frying pan 4, which is heated in the usual manner, as by means of a gas burner 5. Reference to Figure 1 shows that the width of this pan is sufficient to accommodate three doughnuts located in each row across the width of the pan, but manifestly the machine may be made either larger or smaller as desired.

Extending across the end portions of the pan 4 are the sprocket shafts 6 and 7. These carry sprockets 8 and 9 over which travel the flight chains 10 and 11, respectively. These flight chains are provided with the outwardly extending paddles or flights 12, which are connected to the chains 10 and 11 in such manner that said flights project outwardly from the chains during the entire progress around the pan. The result is that when the chains travel in the directions of the arrows in Figures 1 and 2, the flights 12 on the top run of the chains travel from the shaft 6 and sprockets 8 towards the shaft 7 and sprockets 9, and on the bottom run of the chains the flights travel back in the other direction.

As best shown in Figure 2, the bottom end portions of the pan 4 are preferably rounded on quarter rounds 13 and 14 so as to accommodate the circular travel of the flights in moving around the lower portions of the sprockets.

It will be noted that in the normal arrested position of the flights, namely at the left hand or beginning end of the travel, they stand in a horizontal position at 12ª.

At the left hand or beginning end of the machine the pan 4 is enlarged laterally and is extended out into a shallow extension 15, the sides of which extension are practically semi-circular as shown at 16 and 17 in Figure 1. Vertical shafts 18 and 19 are journaled substantially at the centers of these semi-circular portions 16 and 17, said vertical shafts carrying sprockets 20 and 21. Chains 22 and 23 travel around these sprockets 20 and 21, said chains travelling in horizontal planes.

There are outwardly projecting flights 24 connected to the chains 22 and 23 in such manner that said flights stand in vertical planes and as the sprockets rotate in the counter-clockwise direction when viewed as in Figure 1, the flights sweep around through the extension of the frying pan, and said flights stand outwardly at all positions of their travel.

Comparison of Figures 1 and 2 will show that the paths of travel of the flights 12 and 24 intersect each other so that said flights must be specially formed and their intervals of movement must be relatively so timed as to take care of the above condition. During intervals of rest, the flights 24, which may be called the lateral carrier, stand in the relative position shown in Figure 1, and the flights 12 stand in the relative position shown in Figure 2. The flights 12 are radially or outwardly slotted as shown at 25, so that when the flights 24 are at rest in one of their definite positions, the flights 12 can move up or be advanced a position, the slots 25 receiving and slipping past the corresponding flights 24 in order to permit the flight 12ª to move from a horizontal to the next vertical position as shown in Figure 2. When the flights 12 stand in a given position, the flights 24 may be shifted step by step in the direction of the arrows shown in Figure 1.

It will also be observed that the combination of flights 12 and 24 at the left hand end of the machine serve to establish a series of three pockets 26ª, 26ᵇ and 26ᶜ located in a row extending across the machine, and the lower ends of these pockets are defined by the horizontal flight 12ª. The vertical flights 24 will in effect shift the pockets across the frying pan in the direction of the arrow in Figure 1 so as to carry the entrapped doughnuts across the width of the machine.

Located above the pocket 26ª in Figure 1 is a dough hopper 27 which is provided with the downwardly extending throat 28 within which the doughnuts are formed and from which said freshly formed doughnuts are dropped into the pocket 26ª. This dough hopper and doughnut forming and dropping mechanism may be of any convenient construction, such as, for example, that shown in Letters Patent of the United States 1,776,780 issued to me September 30, 1930, although manifestly I do not intend to limit myself to the above or any other specific type of construction. I will state, however that this doughnut forming and dropping mechanism includes a shaft 29 which is rotated in order to form and deliver the doughnuts from the throat 28; and for purposes of convenience, the arrangement may be such that a single doughnut is formed and delivered for each complete revolution of said shaft 29.

I have provided means for advancing the flights 24 one position away from the observer in Figure 1 each time the doughnut forming and dropping mechanism is operated until all of the pockets across the width of the machine (in the present case three) are occupied thereby establishing a row of doughnuts across the width of the machine. In conjunction therewith, I have also provided means for then advancing the flights 12 of the other carrier in the direction of the arrows in the figures, so as to carry the row of doughnuts towards the right to the next position, and at the same time thereby establishing a fresh row of empty pockets for the reception of another series of fresh uncooked doughnuts; and I have also provided means for turning the doughnuts during the course of their travel and for finally delivering them from the pan. These mechanisms I will now explain more in detail.

In the central position of the pan 4 there is a transversely extending turner shaft 30 having the outwardly extending fingers 31 so that by rocking said shaft 30 through a proper angle, somewhat more than a quarter of a revolution, the doughnuts will be lifted by the fingers 30 and advanced and turned over and delivered into the next succeeding position between the flights 12. For this purpose the shaft 30 is provided with a crank arm 32 by means of which it may be rocked.

I have also provided a transversely extending rock shaft 33 having the fingers or arms 34 reaching outwardly therefrom at the delivery end of the machine; so that by turning the shaft 33 through the proper angle, somewhat more than a quarter turn, the doughnuts will be lifted up and delivered out onto a wharf or table 35 and thence to a delivery tray 36. For this purpose the shaft 33 is provided with a crank 37 by means of which it may be rocked.

It will be noted that the shafts 30 and 33 are located high enough up so that the flights 12 pass beneath them; and that the fingers 31 and 34 reach downwardly and then backwardly so that the floating doughnuts will take their position above said fingers and be properly manipulated. It will also be noted in this connection that the edge portions of the flights 12 are slotted or serrated as shown at 38, so that the flights 12 can travel towards the right in Figures 1 and 2 while the doughnut turning and delivering mechanisms are standing in their normal position.

Extending across the machine there is a drive shaft 39 which can be turned in any convenient manner as by means of the crank 40. The shaft 18, upon which the sprockets 20 are secured, extends upwardly a sufficient distance to drive the shaft 29 of the doughnut forming and dropping mechanism, such drive being effected through the medium of the bevel gears 41 and 42. Consequently, the doughnut forming and dropping mechanism is operated in harmony with the movement of the flights 24, and the parts are so timed that the freshly formed doughnuts will be dropped between two of the flights 24 and into the corner pocket 26a as already explained.

Journaled upon the upwardly projecting portion of the shaft 18 is a sleeve 43, the upper end of which carries a worm gear 44 which is driven by a worm 45 on the shaft 39. The lower portion of the sleeve 43 carries a sprocket 46; and a sprocket 47 is journaled on the upwardly extending portion of the shaft 19 at the other side of the machine. A chain 48 passes around the two sprockets 46 and 47, said chain lying, therefore above the flights 24 and above the sprockets 20 and 21.

The chain 48 carries two outwardly extending pin blocks 49 and 50 which are located at opposite sides of the chain so that they are equally spaced around the length of the chain. Each of these pin blocks carries a vertical pin 51 having on its upper end a collar 52. These pins normally drop into the lowered position as indicated in Figure 2, wherein they engage the flights 24 so that the travel of the chain 48 carries with it the flights 24 and chains 22 and 23. On the other hand, by raising the pins 51 in their blocks 49 and 50, they will skip or pass over the top edges of the flights 24 so that the travel of the chain 46 is not communicated to said flights but continued independently of them.

For the above purpose, there are provided the cam plates 53 and 54 at the two ends of the left hand portion of the machine, namely adjacent to the positions of the sprockets 21 and 20, respectively. These cam plates are so formed and positioned that as the chain 48 travels along, carrying with it the blocks 49 and 50, the collars 52 of the pins 51 will ride onto said cam plates, thus raising the pins 51 high enough to cause them to pass over the flights 24, and this condition continues until somewhat less than the distance of two spaces between the flights 24 has been traversed, whereupon the pins are again allowed to descend into position to engage the flights 24 as the travel continues. The result of this condition is that the driving connection between the chain 48 and the transverse carrier is maintained for a distance equal to three pockets, then said driving connection is disestablished and the chain 48 will advance the distance of two additional pockets before said driving connection is again reestablished for a further distance of three pockets, the operations continuing in this manner indefinitely. It will also be noted that the doughnut forming and dropping mechanism will function regularly only during those intervals during which the transverse carrier operates.

It will be noted that the pins 51 extend somewhat above the position of their blocks 49 and 50 as best indicated in Figure 2. Located at the far side of the machine above the position of the frying pan extension 17, there are the vertical shafts 55 and 56. These are provided on their lower ends with the toothed or star wheels 57 and 58 respectively. The teeth of these star wheels project into the path of travel of the upwardly extending portions of the pins 51, so that as the chain 48 moves around the end portion of its course, the upper end of the pin 51 will turn the shaft 55 through a specified amount of rotation and will afterwards turn the shaft 56 through a specified amount of rotation, and these movements will take place during the portion of travel of the chain 48 in which the flights 24 remain stationary. The shaft 55 is connected to the turnover and delivery devices by means of suitable connections including gears 59 and 60, shaft 61, crank 62, and link 63, so that each time the shaft 55 is notched over one portion, the turnover and delivery devices are actuated, being returned to their normal positions by means of a spring 64. The shaft 6 carries on one end a gear 65 meshing with a gear 66 on shaft 69 which connects with the shaft 56 by a suitable train of mechanisms including gears 67 and 68 and shaft 69; the arrangement being such that each time the shaft 56 is notched over one position the shaft 6 is advanced the proper distance to move the carriers 12 forward one position. It will also be noted that this operation takes place during the interval while the flights 24 are stationary.

It will now be evident that I have provided an arrangement whereby the doughnuts are turned over and advanced to the next succeeding pocket and whereby the finished doughnuts are lifted out of the frying pan and are delivered, these operations being performed in proper sequence with respect to the movements of all the other parts of the machine.

While I have herein shown and described only a single embodiment of the features of my present invention, still I do not intend to limit myself thereto except as I may do so in the claims.

I claim:

1. In a machine of the class described, the combination of a frying pan, doughnut-forming and delivering means located above the same and adapted to deliver doughnuts into the pan at a given point, said doughnuts initially sinking below the surface of liquid grease contained within the pan and thereafter rising and floating upon the surface of said grease due to after acquired buoyancy, a conveyor including a chain travelling in closed circuit of travel lying in a vertical plane, radially extending paddles connected to said chain and travelling therewith, said paddles extending in a vertical direction at the positions of the horizontal extending portions of the circuit of travel and said flights extending horizontally at the positions of the end portions of the circuit of travel, one of said end portions of the circuit of travel being located adjacent to the position of introduction of the doughnuts into the pan whereby each flight stands in a substantially horizontal outwardly extending position beneath the doughnut forming and delivering means during the end portion of flight travel, and whereby each flight when in such a position constitutes a substantially horizontal plate adapted to receive and support doughnuts freshly introduced into the liquid grease from the doughnut forming and delivering means.

2. In a machine of the class described the combination of a relatively shallow frying pan adapted to receive and contain liquid grease, means for forming and delivering doughnuts into the pan at a given point, and means for distributing said doughnuts in the pan, said means comprising a conveyor including a chain, or the like, travelling in a closed circuit of travel, lying in a horizontal plane, together with a series of vertical radially extending paddles connected to said chain or the like and reaching outwardly therefrom, and means for advancing said conveyor and paddles harmoniously with respect to introduction of doughnuts into the grease of the pan, whereby the pan may be relatively shallow and contain a minimum quantity of grease due to the travel of said conveyor in a circuit of travel lying in a substantially horizontal plane.

3. In a doughnut machine, a frying pan, a conveyor disposed within said pan and having radially extending paddles adapted at one end of the conveyor to extend substantially horizontally and when intermediate its ends to extend vertically, and means for depositing formed doughnuts upon said paddles when in their substantially horizontal positions.

4. In a doughnut machine, a frying pan, a conveyor disposed within said pan and having radially extending paddles adapted at one end of the conveyor to extend substantially horizontally and when intermediate its ends to extend vertically, and means for successively depositing formed doughnuts in rows upon said paddles when in their substantially horizontal positions.

5. In a doughnut machine, a frying pan, a conveyor within said pan including two vertical shafts and an endless member guided for movement by said shafts and having two runs spaced the same distance from the bottom of the pan, paddles extending outwardly from said endless member and following along the bottom of the pan throughout both runs, means for introducing formed doughnuts between said paddles at one end of the conveyor, and means for removing the doughnuts from said conveyor at another locality.

6. In a doughnut machine, a frying pan, a conveyor within said pan including two vertical shafts and an endless member guided for movement by said shafts and having two runs spaced the same distance from the bottom of the pan, paddles extending outwardly from said endless member and following along the bottom of the pan throughout both runs, means for introducing formed doughnuts between said paddles at one end of the conveyor, and a second conveyor extending transversely of said first named conveyor and including two horizontal shafts, an endless member driven by said shafts, and paddles extending outwardly from said endless member and adapted to extend between the paddles of said first named conveyor to remove the doughnuts from between the same.

7. In a doughnut machine, a frying pan, a conveyor for doughnuts disposed above said frying pan and including two shafts and an endless member guided for movement by said shafts, a driving mechanism carried by both of said shafts and including a movable driving member, a driven member on said endless member for engagement with said driving member, and means for moving said driving member out of engagement with said driven member.

8. In a doughnut machine, a frying pan, a conveyor for doughnuts disposed above said frying pan and including two shafts and an endless member guided for movement by said shafts, a driving mechanism including a chain, a movable driving member on said chain, a driven member on said endless member for engagement with said driving member, and means for moving said driving member out of engagement with said driven member.

9. In a doughnut machine, a frying pan, a conveyor for doughnuts disposed above said frying pan and including two shafts and an endless member guided for movement by said shafts, a driving mechanism including a chain, a guide on said chain, a pin slidable in said guide, a driven member on said endless member for engagement with said pin, and means for moving said pin out of engagement with said driven member.

10. In a doughnut machine, a frying pan, a conveyor for doughnuts disposed above said frying pan and including two shafts and an endless member guided for movement by said shafts, a driving mechanism including a chain, a guide on said chain, a pin slidable in said guide, a driven member on said endless member for engagement with said pin, and a cam disposed along the path of travel of said pin, said cam serving to move said pin out of engagement with said driven member.

11. In a doughnut machine, a frying pan, a conveyor for doughnuts disposed above said frying pan and including an endless member, a driven member on said endless member, a second conveyor for doughnuts disposed above said frying pan and including an endless member, a driven member on said second endless member, a driving mechanism for said conveyors, said driving mechanism including a chain, and a driving member on said chain adapted in one position of the chain to engage said first driven member and in another position of said chain to engage said second driven member to effect successive operation of said conveyors.

12. In a doughnut machine, a frying pan, a conveyor for doughnuts disposed above said frying pan and including an endless member, a driven member on said endless member, a turnover device for the doughnuts including a movable member, a driven member on said movable member, a driving mechanism for said conveyor and turnover device, said driving mechanism including a chain, and a driving member on said chain adapted in one position of said chain to engage said first driven member and in another position of said chain to engage the second driven member.

CHARLES E. CARPENTER.